No. 682,451. Patented Sept. 10, 1901.
R. J. BOWMAN.
VACUUM PAN.
(Application filed Nov. 15, 1900.)

(No Model.) 2 Sheets—Sheet 1.

WITNESSES: INVENTOR
Robert J. Bowman
BY
ATTORNEYS

UNITED STATES PATENT OFFICE.

ROBERT JAMES BOWMAN, OF ALEXANDRIA, LOUISIANA.

VACUUM-PAN.

SPECIFICATION forming part of Letters Patent No. 682,451, dated September 10, 1901.

Application filed November 15, 1900. Serial No. 36,582. (No model.)

*To all whom it may concern:*

Be it known that I, ROBERT JAMES BOWMAN, a citizen of the United States, and a resident of Alexandria, in the parish of Rapides and State of Louisiana, have invented a new and Improved Vacuum-Pan, of which the following is a full, clear, and exact description.

This invention relates to improvements in vacuum-pans and double effects for the conversion of juice of sugar-cane, sugar-beets, or the like into sugar or syrup.

It is an ordinary practice to remove the vapor rising from the boiling liquid or saccharine matter by means of an air-pump and a spray-condenser connected with the pan by a large pipe.

The object of my invention is to provide a means for condensing and removing the vapor by the application of a freezing or cold-producing medium within the pan instead of by an air-pump and a spray-condenser, the medium being cold water or that received from an ordinary ice-producing machine, that may be connected to the plant, thus materially reducing the cost of production of the sugar or syrup.

I will describe the vacuum-pan embodying my invention and then point out the novel features in the appended claims.

Reference is to be had to the accompanying drawings, forming a part of this specification, in which similar characters of reference indicate corresponding parts in both the figures.

Figure 1:
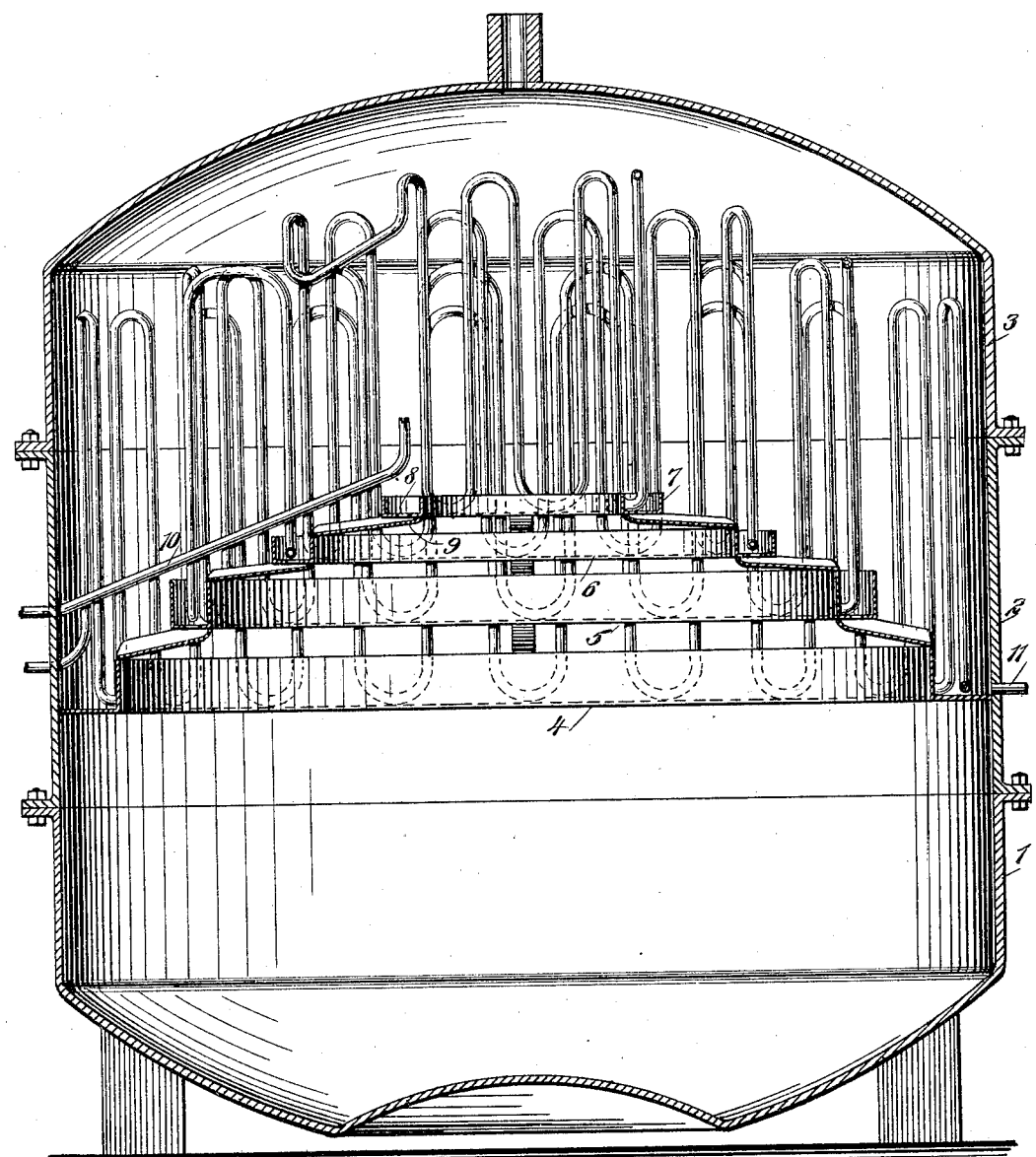
Figure 2:
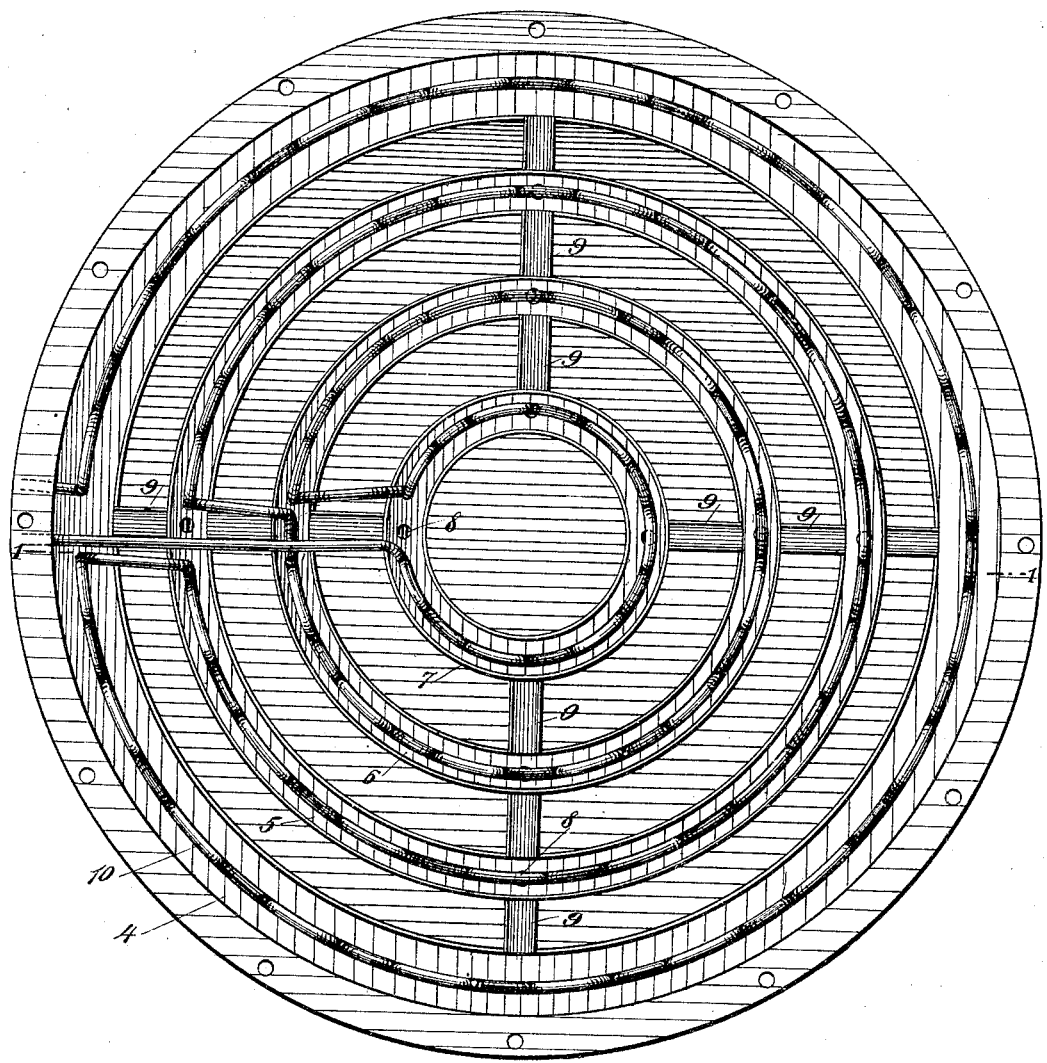

Figure 1 is a sectional elevation, on the line 1 1 in Fig. 2, of a vacuum-pan embodying my invention; and Fig. 2 is a horizontal section thereof.

The vacuum-pan, for convenience in placing the cooling device therein and also for convenience in taking it apart for cleaning or the like, is made in three sections, here shown as a bottom section 1, a central section 2, and a top section 3, these several sections being provided with outwardly-extended flanges, through which fastening-bolts are passed, as plainly indicated in Fig. 1. The pan containing the liquid to be treated is heated by any suitable means—such, for instance, as by an ordinary steam-coil placed within the bottom of the same; but it is not deemed necessary to show such heating means in the drawings.

Arranged in the pan at about its center is a series of circular troughs 4, 5, 6, and 7, the trough 4 being made in the wall of the pan or made separate and attached thereto. These troughs are arranged one above another and gradually diminish in circumference from the lower trough to the upper trough. The upper trough 7 has openings 8, from which spouts 9 lead to the next lower trough 6, and similar spouts lead from the trough 6 to the trough 5, and spouts lead from the trough 5 to the trough 4. These spouts between the troughs 5, 6, and 7 bind them firmly in position, and the spouts from the trough 5 rest loosely on the outer wall of the trough 4 as a foundation for the other troughs.

A continuous circulating-pipe 10 is arranged within the pan and formed in a number of concentric circles corresponding to the number of troughs arranged in the pan. Each circle consists of upright members connected at the top and bottom, and the lower portions extend into the troughs, as plainly indicated in the drawings. The ends of the pipe extend through a wall of the pan, and one end is designed to be connected with the compression-tank of an ice-forming machine or a tank or other reservoir or supply of cold water, while the other end is to be attached to a reservoir for receiving ammonia after passing through the coil or, if water is used, with the reservoir for water. However, I do not limit myself to this arrangement, as any other cooling medium may be circulated through the pipe.

In operation while the juice is boiling in the pan the ammonia-vapor from the compression-tank of the ice-machine, if ammonia-vapor is used, or water, if water is used, is passed through the coil 10, and by the cold produced by said cooling medium passing through said pipe the vapors rising from the juice will be condensed on the outer side of the coil, and the water produced by said condensation runs down into the troughs, all of it finally entering the lower trough 4, from which it may be withdrawn through a pipe 11. It is evident that a large percentage of condensed water settles on the wall of the vacuum-pan and finally flows downward into the annular trough 4 to be conducted to the outside of the pan. Thus the trough forms a valuable feature of the invention, as without the trough 4 vapor condensed on the wall of the pan would always flow back into the juice, and consequently the use of the internal condenser would not produce the desired results.

The troughs 5, 6, and 7 are rigidly connected with each other by the spouts or otherwise to permit of removing such troughs whenever desired without disturbing the main trough 4 on the wall of the vacuum-pan.

I do not limit myself to the peculiar shape and arrangement of the troughs shown and described, as they may be varied without deviating from the spirit of my invention.

Having thus described my invention, I claim as new and desire to secure by Letters Patent—

1. A vacuum-pan having a trough on the inside of the wall of the pan, and a serpentine condensing-pipe located adjacent to the wall of the pan, the convolutions of the pipe extending vertically above the trough, as set forth.

2. A vacuum-pan having a plurality of troughs arranged therein at different horizontal levels, and a condensing-pipe within the pan and through which is adapted to pass a cold-producing agent, the said pipe conforming in arrangement to the several troughs to discharge the liquid condensed on the outside of the pipe into the troughs, as set forth.

3. A vacuum-pan having a condensing-pipe within the pan and through which is adapted to pass a cold-producing agent, the pipe being arranged with vertical members having bends at the top and bottom, and a plurality of water-collecting troughs arranged within the pan, for receiving the water condensed on the outside of the said pipe, as set forth.

4. A vacuum-pan having a series of troughs arranged within the pan, and with one of the troughs on the inside of the wall of the pan, the troughs being arranged one above another and gradually diminishing in size from the lower trough to the upper and a condensing-pipe within the pan and having vertical members connected by bends located over the troughs to discharge the condensed water into the troughs, as set forth.

5. The combination with a vacuum-pan, of a series of removable troughs arranged therein, spouts connecting the troughs, a fixed trough on the inside of the wall of the pan, and arranged to support the removable troughs, and a condensing-pipe within the pan and arranged to discharge the condensed water into the troughs, as set forth.

6. The combination with a vacuum-pan, of a series of troughs arranged therein one above another, and communicating one with another, and a condensing-pipe comprising vertical members connected at the top and bottom and formed into concentric circles conforming to the circles of the troughs, substantially as specified.

7. The combination with a vacuum-pan, of a series of troughs arranged within the pan, the said troughs being circular and gradually diminishing in diameter from the lower to the upper trough, spouts connecting the troughs, and a condensing-pipe formed in concentric circles and having vertically-disposed members, the lower portions of said members being extended into the troughs, substantially as specified.

8. The combination with a vacuum-pan, of a series of troughs arranged therein around a common center and at different horizontal levels, the said troughs communicating one with the other and arranged to permit of the upward passage of the vapors rising from the juice in the pan, a continuous condensing-pipe arranged within the pan, and extending above the troughs and conforming in arrangement thereto, so that the water of condensation will pass from the surface of the pipe into the troughs, and means for carrying off the water of condensation from the troughs, as set forth.

9. The combination with a vacuum-pan, of a plurality of troughs arranged therein and having a common center, the troughs being of different sizes, and spaced apart to permit of the upward passage of the vapors rising from the juice in the pan, and a condensing-pipe conforming in arrangement to the several troughs, to discharge the liquid condensed on the surface of the pipe into the troughs, as set forth.

10. The combination with a vacuum-pan, of a condensing-pipe within the pan, formed in sections arranged one within the other, each section having vertically-disposed members connected at the top and bottom, and means for receiving and carrying off the liquid condensed on the outside of said pipe, as set forth.

In testimony whereof I have signed my name to this specification in the presence of two subscribing witnesses.

ROBERT JAMES BOWMAN.

Witnesses:
CHAS. M. KILPATRICK,
C. L. RANSDELL.